United States Patent
Li et al.

(10) Patent No.: US 9,633,463 B2
(45) Date of Patent: Apr. 25, 2017

(54) USER GESTURE DRIVEN AVATAR APPARATUS AND METHOD

(71) Applicant: Intel Corporation, Santa Clara, CA (US)

(72) Inventors: Qiang Li, Beijin (CN); Xiaofeng Tong, Beijing (CN); Yangzhou Du, Beijing (CN); Wenlong Li, Beijing (CN); Caleb J. Ozer, Portland, OR (US); Jose Elmer S. Lorenzo, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/763,792

(22) PCT Filed: Sep. 24, 2014

(86) PCT No.: PCT/CN2014/087248
§ 371 (c)(1),
(2) Date: Jul. 27, 2015

(87) PCT Pub. No.: WO2016/045005
PCT Pub. Date: Mar. 31, 2016

(65) Prior Publication Data
US 2016/0247309 A1 Aug. 25, 2016

(51) Int. Cl.
*G06T 13/40* (2011.01)
*G06F 3/0488* (2013.01)
(Continued)

(52) U.S. Cl.
CPC .............. *G06T 13/40* (2013.01); *G06F 3/011* (2013.01); *G06F 3/04883* (2013.01);
(Continued)

(58) Field of Classification Search
CPC ......... G06T 13/40; G06T 13/80; G06T 13/00; G06T 2213/12; G06T 13/20;
(Continued)

(56) References Cited

U.S. PATENT DOCUMENTS 9,120,013 B1 *   9/2015   Daniel .................. G07F 17/326
2010/0281438 A1 *  11/2010   Latta ...................... A63F 13/42
                                                            715/863

(Continued)

FOREIGN PATENT DOCUMENTS

CN          102934144 A       2/2013
CN          103207745 A       7/2013

OTHER PUBLICATIONS

Kalra et al., A Multimedia Testbed for Facial Animation, International Conference of Multi-Media Modeling, MMM'93, 1993, obtained from http://citeseerx.ist.psu.edu/viewdoc/summary?doi=10.1.1.14.5426 on Aug. 30, 2016.*
Joanne Carter, New—Reallusion Launches CrazyTalk App for iOS, posted on Jun. 3, 2013, obtained from http://theappwhisperer.com/2013/06/newreallusionlaunchescrazytalkappforios/.*
(Continued)

*Primary Examiner* — Haixia Du
(74) *Attorney, Agent, or Firm* — Schwabe, Williamson & Wyatt, P.C.

(57) ABSTRACT

Apparatuses, methods and storage medium associated with animating and rendering an avatar are disclosed herein. In embodiments, the apparatus may include a gesture tracker and an animation engine. The gesture tracker may be configured to detect and track a user gesture that corresponds to a canned facial expression, the user gesture including a duration component corresponding to a duration the canned facial expression is to be animated. Further, the gesture tracker may be configured to respond to a detection and tracking of the user gesture, and output one or more animation messages that describe the detected/tracked user gesture or identify the canned facial expression, and the duration. The animation engine may be configured to receive the one or more animation messages, and drive an avatar model, in
(Continued)

(a) Finger swipe left first (b) Then finger swipe right accordance with the one or more animation messages, to animate the avatar with animation of the canned facial expressions for the duration. Other embodiments may be described and/or claimed.

17 Claims, 8 Drawing Sheets

(51) Int. Cl.
    *G06T 15/00*         (2011.01)
    *G06T 15/50*         (2011.01)
    *G06F 3/01*          (2006.01)
    *A63F 13/428*       (2014.01)
    *A63F 13/2145*     (2014.01)

(52) U.S. Cl.
    CPC .......... *G06T 15/005* (2013.01); *G06T 15/503* (2013.01); *A63F 13/2145* (2014.09); *A63F 13/428* (2014.09); *A63F 2300/6607* (2013.01)

(58) Field of Classification Search
    CPC ....... G06T 2200/24; G06T 2207/10016; G06T 2207/30201; G10L 2021/105; A63F 2300/6607
    See application file for complete search history.

(56) References Cited

U.S. PATENT DOCUMENTS

2014/0225901 A1    8/2014  Shuster et al.
2015/0084950 A1*  3/2015  Li ........................ G06T 7/2046
                                                       345/419

OTHER PUBLICATIONS

International Search Report and Written Opinion mailed Jun. 15, 2015 for International Application No. PCT/CN2014/087248, 11 pages.

* cited by examiner

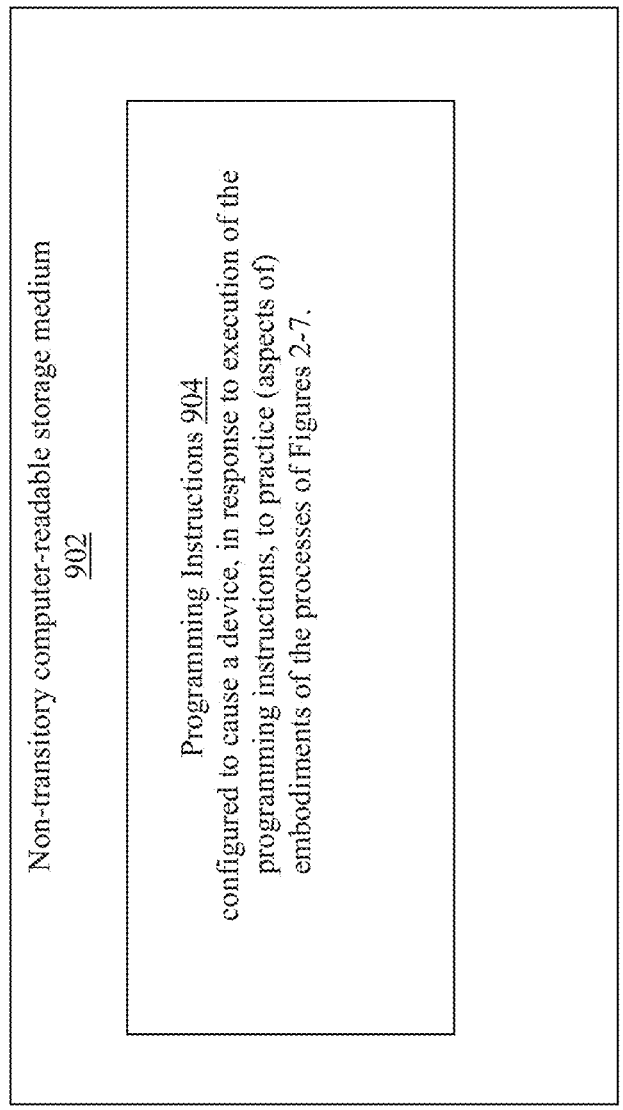

US 9,633,463 B2

USER GESTURE DRIVEN AVATAR APPARATUS AND METHOD

CROSS REFERENCE TO RELATED APPLICATIONS

The present application is a national phase entry under 35 U.S.C. §371 of International Application No. PCT/CN2014/087248, filed Sep. 24, 2014, entitled "USER GESTURE DRIVEN AVATAR APPARATUS AND METHOD", which designated, among the various States, the United States of America. The Specification of the PCT/CN2014/087248 Application is hereby fully incorporated by reference.

TECHNICAL FIELD

The present disclosure relates to the field of data processing. More particularly, the present disclosure relates to user gesture driven animation and rendering of avatar.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As user's graphic representation, avatar has been quite popular in virtual world. However, most existing avatar systems are static, and few of them are driven by text, script, or voice. Some other avatar systems use graphics interchange format (GIF) animation, which is a set of predefined static avatar image playing in sequence. In recent years, with the advancement of computer vision, camera, image processing, etc., some avatar may be driven by facial expression. However, existing systems tend to be computation intensive, requiring high-performance general and graphics processor, and do not work well on mobile devices, such as smartphones or computing tablets. Moreover, existing systems do not support or have very limited support for users to interact with the animation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 9 illustrates a storage medium having instructions for practicing methods described with references to FIGS. 2-7, according to disclosed embodiments.

DETAILED DESCRIPTION

Figure 1:
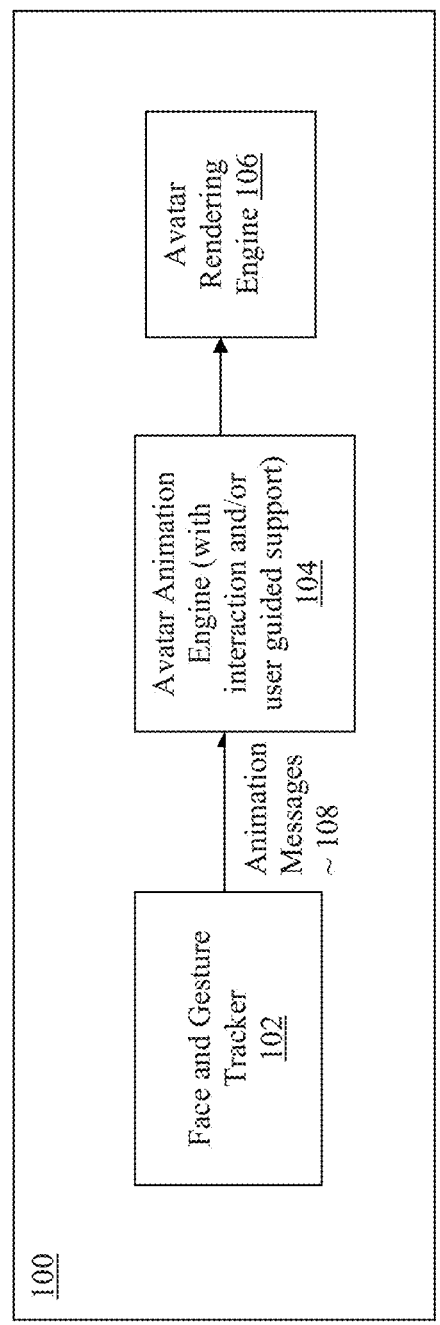
FIG. 1 illustrates a block diagram of a pocket avatar system, according to the disclosed embodiments.

Apparatuses, methods and storage medium associated with animating and rendering an avatar are disclosed herein. In embodiments, the apparatus may include a gesture tracker and an animation engine. The gesture tracker may be configured to detect and track a user gesture that corresponds to a canned facial expression, the user gesture including a duration component corresponding to a duration the canned facial expression is to be animated. Further, the gesture tracker may be configured to respond to a detection and tracking of the user gesture, and output one or more animation messages that describe the detected/tracked user gesture or identify the canned facial expression, and the duration. The animation engine may be configured to receive the one or more animation messages, and drive an avatar model, in accordance with the one or more animation messages, to animate the avatar with animation of the canned facial expressions for the duration.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a pocket avatar system, according to the disclosed embodiments, is shown. As illustrated, pocket avatar system 100 may include face and gesture tracker 102, avatar animation engine 104, and avatar rendering engine 106, coupled with each other as shown. Face and gesture tracker 102 may be configured to detect facial expressions, head poses, and/or hand/finger gestures of a user, and output animation messages 108 having information about the detected facial expressions, head poses, hand/finger gestures and/or related/inferred data for avatar animation engine 104. Avatar animation engine 104 may be configured to receive animation messages 108, and drive an avatar model, in accordance with animation messages 108, to animate the avatar, replicating a facial expression and/or head movement of the user, or a canned facial expression on the avatar. Animation of a canned facial expression may also include user controlled holding and/or movements/actions of the canned facial expression. Avatar rendering engine 106 may be configured to draw the avatar as animated by avatar animation engine 104.

In embodiments, face and gesture tracker 102 may be configured to receive a plurality of image frames, e.g., from an image source, such as a camera (not shown), detect facial action movements of a face of a user, head pose gestures of a head of the user, and/or hand/finger gestures of a hand of the user within the plurality of image frames, and output animation messages having a plurality of facial motion parameters that depict facial action movements detected, e.g., eye and/or mouth movements, head pose gesture parameters that depict head pose gestures detected, such as head rotation, movement, and/or coming closer or farther from the camera, and/or hand/finger gesture parameters that depict hand/finger gestures detected, all in real time. Face and gesture tracker 102 may also be configured to receive touch signals, e.g., from a touch screen driver associated with a touch screen (not shown), detect hand/finger gestures of a hand of the user based on the touch signals, and output a plurality of hand/finger gesture parameters that depict hand/finger gestures detected, also in real time. Additionally, animation messages 108 may include information identifying canned facial expressions corresponding to detected hand/finger gestures of the user. Further, animation messages 108 may include information about a duration the canned facial expression to be held, and/or facial movements of the canned facial expression, to enable animation of canned facial expressions to be interactive, thereby potentially making animation of canned facial expressions more interesting.

In embodiments, face and gesture tracker 102 may include at least head pose, mouth openness, mesh tracking, and/or hand/finger gesture function blocks that are sufficiently accurate, yet scalable in their processing power required, making pocket avatar system 100 suitable to be hosted by a wide range of mobile computing devices, such as smartphones and/or computing tablets. Except for hand/finger gesture detection, output of animation messages 108 that include information about detected hand/finger gestures, corresponding canned facial expressions, hold time, and/or movements/actions, face and gesture tracker 102 may be the facial mesh tracker disclosed in PCT Application PCT/CN2014/073695, entitled FACIAL EXPRESSION AND/OR INTERACTION DRIVEN AVATAR APPARATUS AND METHOD, filed on Mar. 19, 2014.

In embodiments, avatar animation engine 104 may replicate a facial expression of the user or a canned facial expression on the avatar, through blending of a plurality of pre-defined shapes, further making pocket avatar system 100 suitable to be hosted by a wide range of mobile computing devices. In embodiments, a model with neutral expression and some typical expressions, such as mouth open, mouth smile, brow-up, and brow-down, blink, etc., may be first pre-constructed, prior to facial/gesture tracking and animation. The blend shapes may be decided or selected for various face and gesture tracker 102 capabilities and target mobile device system requirements. During operation, face and gesture tracker 102 may output the blend shape weights (e.g., as part of animation messages 108) for avatar animation engine 104.

Upon receiving the blend shape weights ($\alpha_i$) for the various blend shapes, avatar animation engine 104 may generate the expressed facial results with the formula:

$$B* = B_0 + \sum_t \alpha_i \cdot \Delta B_i$$

where
B* is the target expressed facial,
$B_0$ is the base model with neutral expression, and
$\Delta B_i$ is $i^{th}$ blend shape that stores the vertex position offset based on base model for specific expression.

Compared with other facial animation techniques, such as motion transferring and mesh deformation, using blend shape for facial animation may have several advantages: 1) Expressions customization: expressions may be customized according to the concept and characteristics of the avatar, when the avatar models are created. The avatar models may be made more funny and attractive to users. 2) Low computation cost: the computation may be configured to be proportional to the model size, and made more suitable for parallel processing. 3) Good scalability: addition of more expressions into the framework may be made easier.

Figure 2:
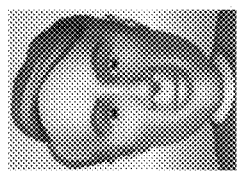
FIGS. 2-4 illustrate interaction driven avatar animation, according to the disclosed embodiments.
Figure 2:
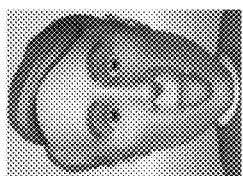
Figure 2:
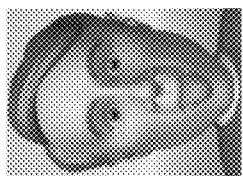
Figure 2:
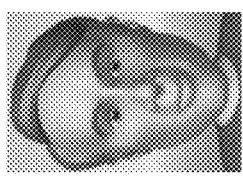
Figure 3:
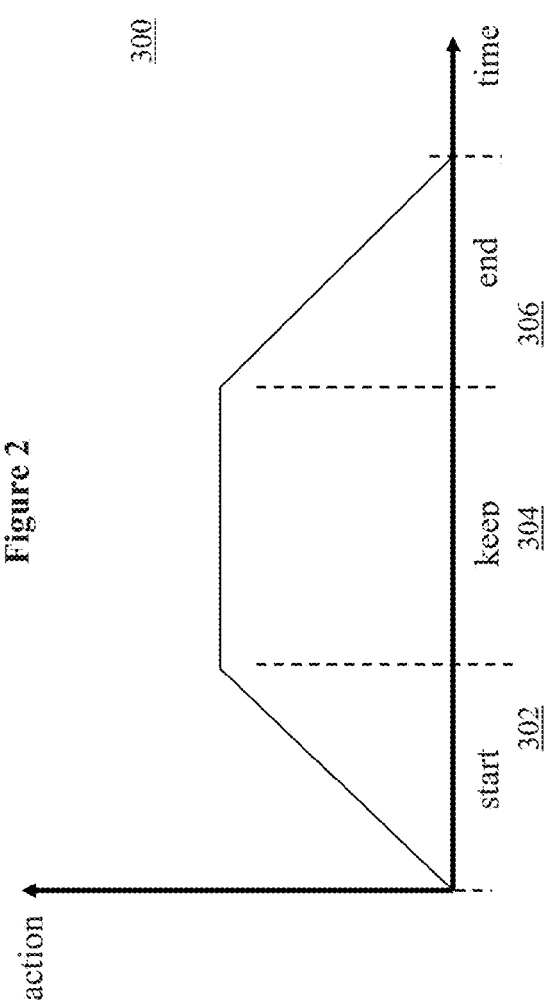
Figure 4:
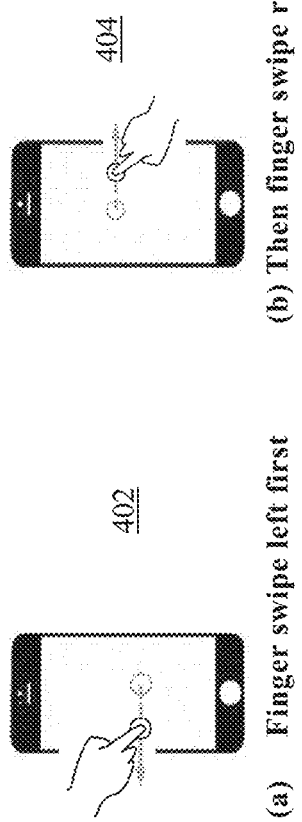
Figure 4:
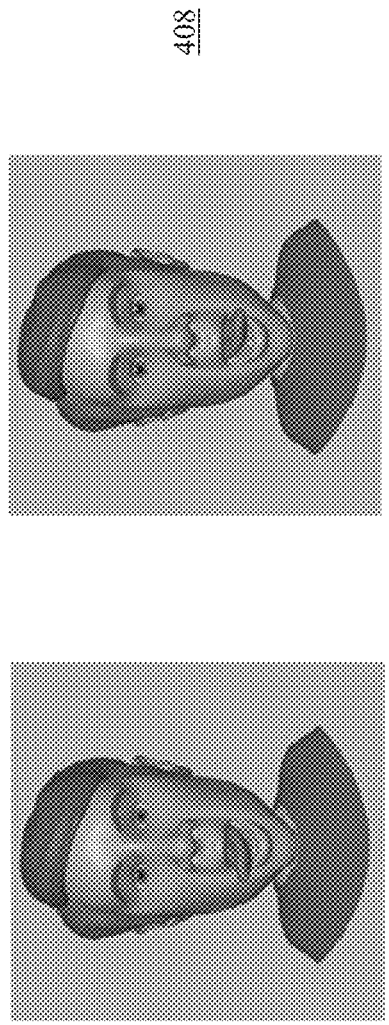

Referring now also to FIGS. 2-4, as described earlier, in embodiments, face and gesture tracker 102 and avatar animation engine 104 may be configured to cooperate to support user interaction driven avatar animation, where a canned facial expression, e.g., sticking a tongue out, corresponding to a user interaction, e.g., a swipe gesture, may be animated. See FIG. 2, wherein the example animation of the canned facial expression 200 of sticking a tongue out, corresponding to a user interaction, is illustrated. In embodiments, for each animation of a canned facial expression, animation engine 104 may blend one or more pre-defined shapes to a neutral face to transition the avatar from the neutral face to the particular canned facial expression during a start period, 302 of graph 300 of FIG. 3. Further, animation engine 104 may hold the canned facial expression during a keep period, 304 of graph 300 of FIG. 3. Finally, animation engine 104 may un-blend the one or more pre-defined shapes to transition the avatar from the canned facial expressions back to the neutral face during an end period, 306 of graph 300 of FIG. 3.

In embodiments, face and gesture tracker 102 may be configured to detect a user gesture corresponding to a canned facial expression, e.g., a swipe, with a duration component, e.g., the swipe terminating with the user continuously touching a touch screen for a period time. In other words, the terminating continuous touching serves as the duration component of the gesture, and the time period denotes the duration the animation of the canned facial expression is to be held. For these embodiments, on detection of a gesture with a duration component, face and gesture tracker 102 may be configured to further include in the animation messages 108, information of the duration of hold (i.e., the length of keep period 304) in addition to information describing the detected gesture or identifying the canned facial expression to be animated.

Further, in embodiments, face and gesture tracker 102 may be configured to detect a user gesture corresponding to a canned facial expression, e.g., a swipe, with a movement or action component, e.g., a swipe terminating with the user continuously touching a touch screen and moving back and forth in a first and a direction, for a period time. See FIG. 4, wherein a user finger is illustrated as continually swiping left and right, while touching the touch screen, after the initial swipe gesture. In other words, the continuous swiping first to the left, then to the right, and so forth, form the movement or action component of the gesture. In response, animation engine 104 may further drive the avatar model to animate a movement or action within the canned facial expression, e.g., movement of the tongue to the left then to the right, and so forth, 406 and 408 of FIG. 4.

Continuing to refer to FIG. 1, in embodiments, there may be two types of animation messages 108, facial expression animation messages, and interaction messages. The facial expression messages may be used to support facial expression (including head pose) driven avatar animation, as described in PCT Application PCT/CN2014/073695.

In embodiments, the interaction messages may specify the interaction type, and duration information. The interaction type may index to a corresponding canned expression to be animated, e.g., but not limited, tongue-out 200, wink (not shown), kiss (not shown), and so forth. The duration information may specify a start period 302, a keep period 304 and an end period 306. In embodiments, start period 302 may define the number of frames in the starting stage. For example, for the Tongue Out example, the avatar will stick out the tongue in this stage. Keep period 304 may define the time to keep the current status, whereas end period 306 may define when the avatar should recover back to neutral expression. In other words, end period 306 may define the recovering time from the interaction expression to the neutral face.

As described earlier, in embodiments, avatar animation engine 104 may employ blend shapes. For these embodiments, the expression may be animated for the start, keep and end periods 302-304 as follows:

$$B_t = \begin{cases} B_0 + \dfrac{t}{N_s}\Delta B, & \text{if } 0 \le t < N_s \\ B_0 + \Delta B, & \text{if } N_s \le t < N_s + N_k \\ B_0 + \dfrac{t - N_s - N_e}{N_e}\Delta B, & \text{if } N_s + N_k \le t < N_s + N_k + N_e \end{cases}$$

where
$B_t$ is the expression at a point in time,
$B_0$ and $\Delta B$ are as earlier defined,
t is time, and
$N_s$, $N_k$, and $N_e$ are the number of frames for the start, keep and end periods.

Figure 5:
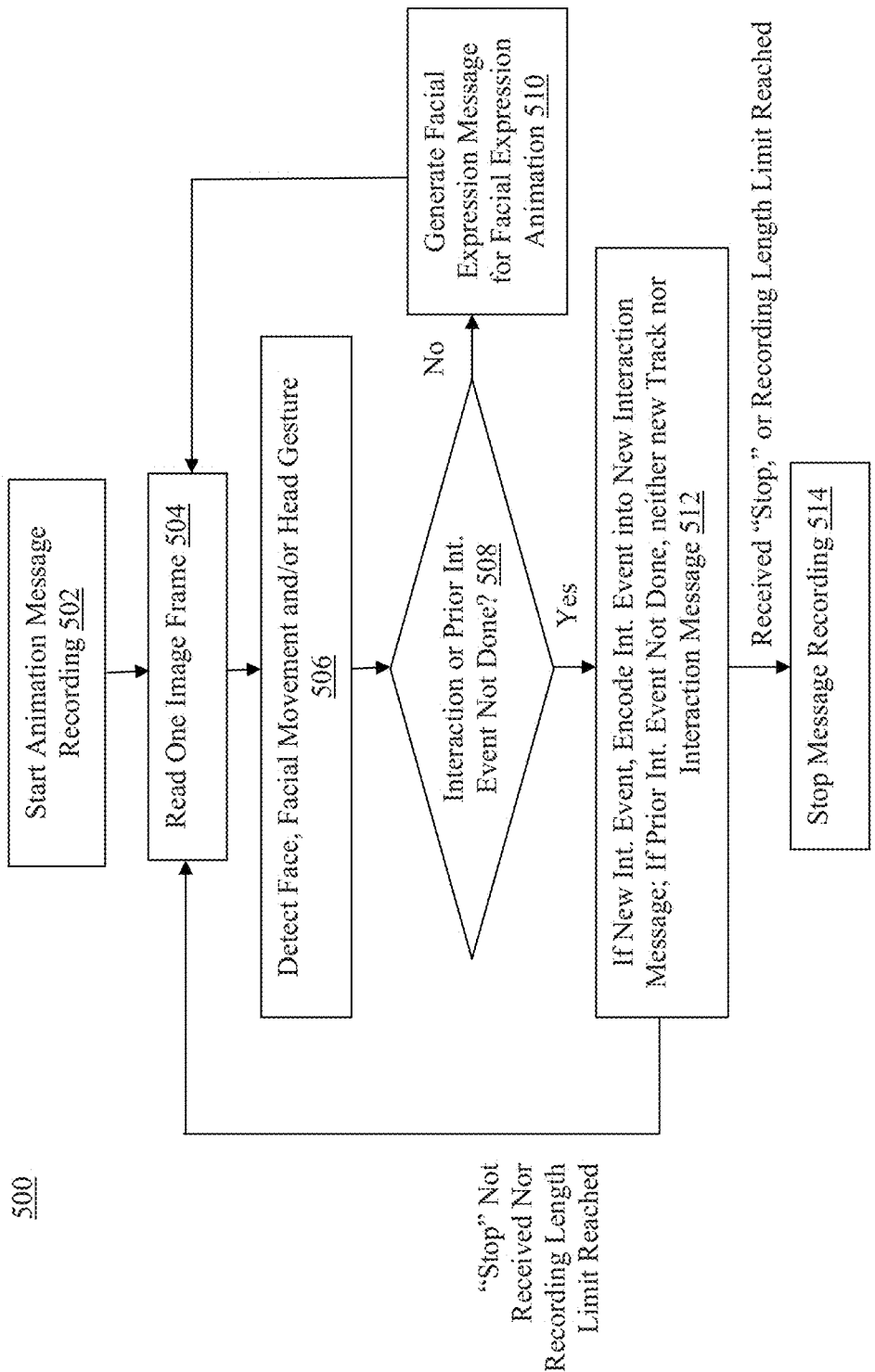
FIG. 5 is a flow diagram illustrating a process for generating facial expression and interaction animation messages, according to the disclosed embodiments.

Referring now to FIG. 5, wherein a process for generating facial expression and interaction animation messages, is illustrated, according to the disclosed embodiments. Process 500 for generating facial expression and interaction animation messages may be performed e.g., by the earlier described face and gesture tracker 102 of FIG. 1. As shown, the process may start at block 502 where recording of animation messages may begin. Message recording may begin in response to e.g., a user providing a start recording instruction, such as a click on a start recording button in a user interface provided by pocket avatar system 100. At block 504, an image frame (or a period of touch signal) may be read. At block 506, a face and facial movements or user gesture within the image frame or the period of touch signal may be detected.

At block 508, a determination may be made as to whether a new interaction has been detected, or a prior interaction event remains not completed. If no new interaction has been detected, nor any prior interaction event remains in progress, at block 510, a facial expression message with facial movement data may be generated, for facial expression animation. From block 510, process 500 may continue at block 504 as earlier described.

At block 512, if a new interaction has been detected, a new interaction message with the interaction and duration information may be generated, to facilitate animation of the corresponding canned expression. However, if a prior interaction event remains in progress, neither facial expression nor interaction message will be generated, allowing interaction animation of the corresponding canned expression of the prior interaction to continue. From block 512, process 500 may continue at block 504 as earlier described, if neither a stop recording instruction has been received, nor a recording length limit threshold has been reached. On the other hand, if either a stop recording instruction has been received, or a recording length limit threshold has been reached, process 500 may proceed to block 514 and terminates.

Figure 6:
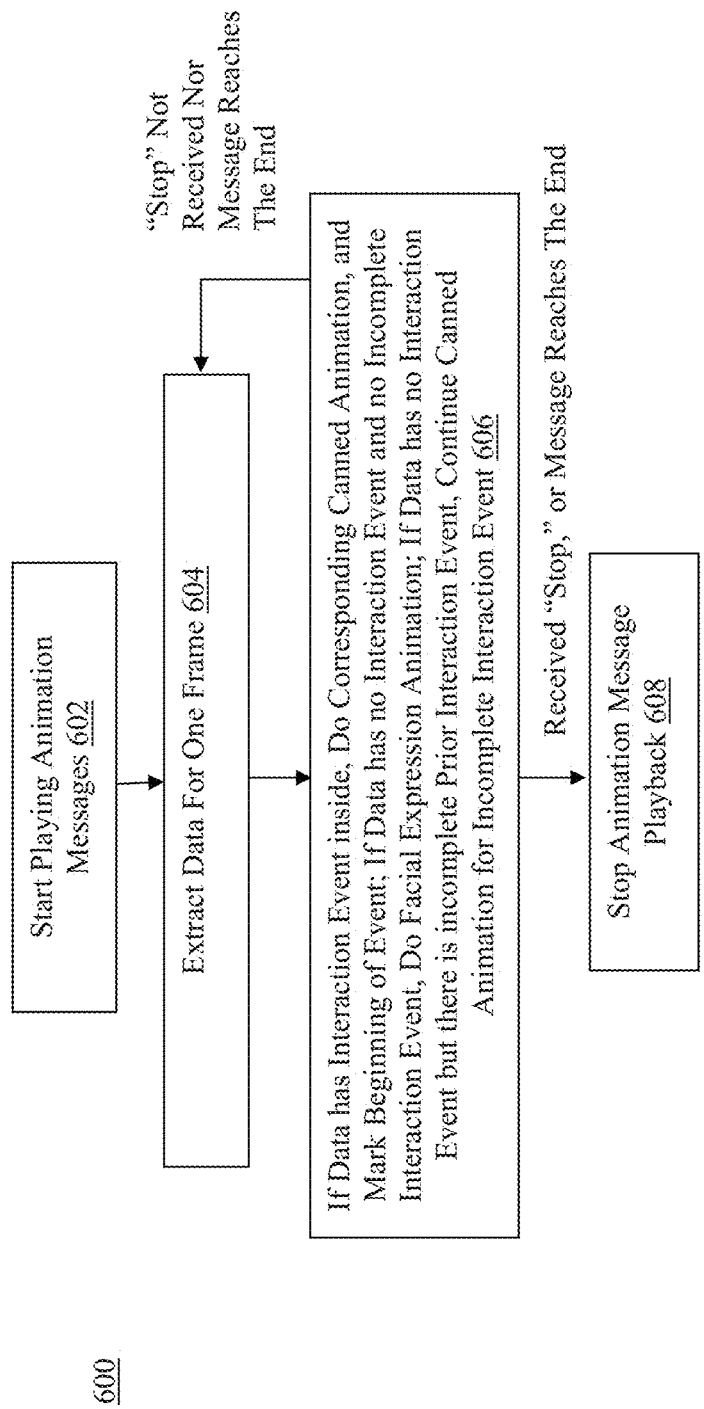
FIG. 6 is a flow diagram illustrating a process for interleaving facial expression and interaction animations, according to the disclosed embodiments.

FIG. 6 is a flow diagram illustrating a process for interleaving facial expression and interaction driven animation, according to the disclosed embodiments. Process 600 for interleaving facial expression and interaction driven animation may be performed e.g., by the earlier described avatar animation engine 104 of FIG. 1. As shown, the process may start at block 602 where playing of animation messages may begin. Message playing may begin contemporaneously with recording, in response to e.g., a user providing a start recording/playing instruction, such as a click on a start recording/playing button in a user interface provided by pocket avatar system 100. At block 604, an animation message corresponding to an image frame may be read, and its data extracted.

At block 606, if the extracted data has interaction event inside, animation of the index canned expression is performed. Further, a marking of the beginning of a new interaction event may be made. However, if the extracted data has no interaction event inside, and currently there is no incomplete animation of any canned expression for a prior interaction event, animation of facial expression, in accordance with the facial expression data in the animation message is performed. On the other hand, if the extracted data has no interaction event inside, but currently there is incomplete animation of a canned expression for a prior interaction event, then animation of the canned expression corresponding to the prior interaction event continues.

From block 606, process 600 may continue at block 604 as earlier described, if neither a stop recording/playing instruction has been received, nor end of messages has been reached. On the other hand, if either a stop recording/playing instruction has been received, or end of messages has been reached, process 600 may proceed to block 608 and terminates.

Figure 7:
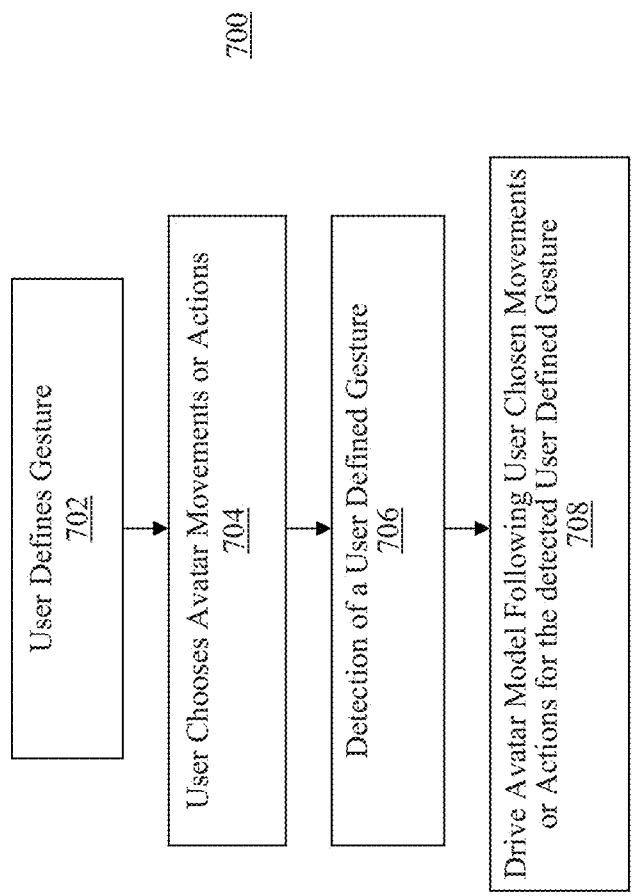
FIG. 7 is a flow diagram illustrating a process for guided animation with user defined gestures, according to the disclosed embodiments.

Referring now to back to FIG. 1, in embodiments, portable avatar system 100 may be further configured to support user defined gestures. Referring also to FIG. 7, wherein a flow diagram illustrating a process for avatar animation that includes user defined gestures, in accordance with embodiments, is shown. As illustrated, process 700 for avatar animation that includes user defined gestures may include operations associated with blocks 702-708. Operations associated with blocks 702-704 may be performed e.g., by face and gesture tracker 102, whereas operations associated with blocks 706-708 may be performed e.g., by animation engine 104.

At block 702, user definitions of a gesture may be accepted. In embodiments, the user definitions may be accepted through a user interface (not shown), provided by e.g., face and gesture tracker 102. The user definitions may include finger movement trajectory, facial gestures and so forth, as well as source of inputs, e.g., from image frames provided by an image source, from a touch driver associated with a touch screen, or other sensor sources.

At block 704, user choices of avatar movements or actions may be accepted. Similarly, in embodiments, the user choices may be accepted through a user interface (not shown), provided by e.g., face and gesture tracker 102. The user choices may include guided movement, i.e., the avatar model to move according to the path defined by the user defined trajectory, random movement, or other "canned" movements, such as, fade away—where the avatar is to be zoomed out until it disappears;

bounce—where the avatar is to move up and down using a predefined pattern;

spin—where the avatar is to turn around or spin relative to an axis (vertical, horizontal, or angled).

In embodiments, the pocket avatar system 100, via face and user gesture tracker 102 and/or avatar animation engine 104, may provide several icon buttons on the screen, which stand for different movement patterns, e.g., bounce, spin, etc. In one example scenario, in response to a user tapping the "bounce" button and doing a swipe left gesture on the screen, avatar animation engine 104 may drive the avatar model to move the avatar to the left boundary of the screen and make bump animation, then return the avatar back to its default position. For another instance, in response to a user tapping the "spin" button and doing a anti-clock wise gesture on the screen, avatar animation engine 104 may drive the avatar model to rotate the avatar anti-clock wise along the Y-axis. These are illustrative and non-limiting examples.

While pocket avatar system 100 is designed to be particularly suitable to be operated on a mobile device, such as a smartphone, a phablet, a computing tablet, a laptop computer, or an e-reader, the disclosure is not to be so limited. It is anticipated that pocket avatar system 100 may also be operated on computing devices with more computing power than the typical mobile devices, such as a desktop computer, a game console, a set-top box, or a computer server.

Figure 8:
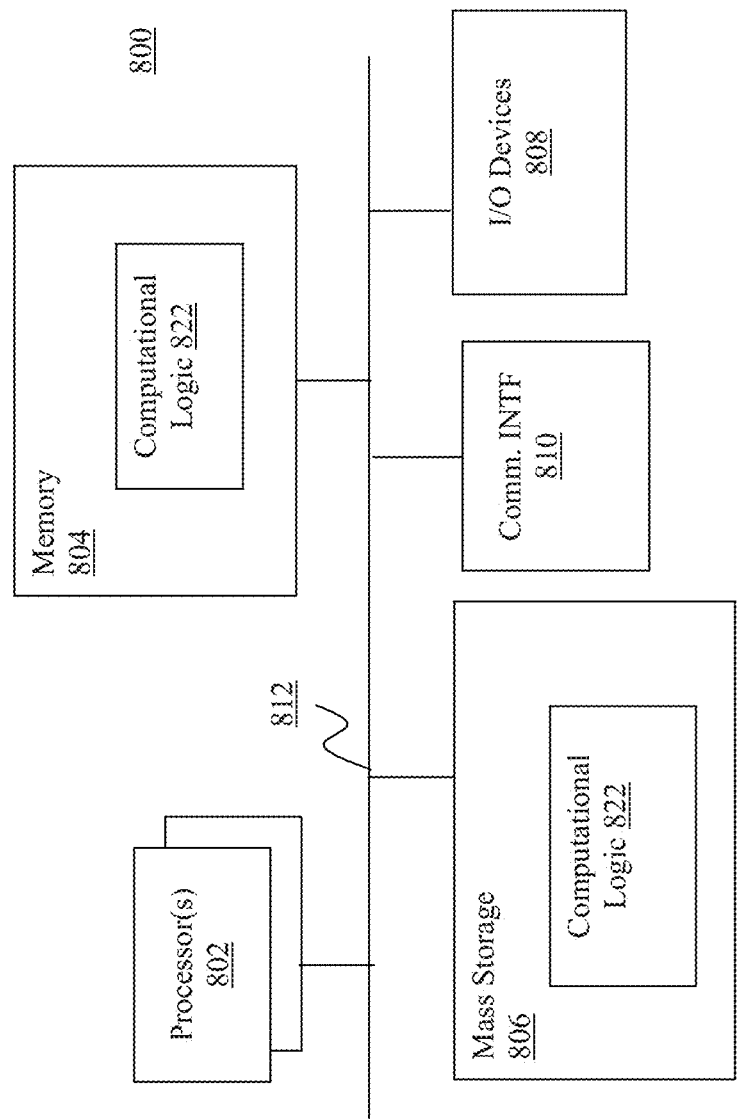
FIG. 8 illustrates an example computer system suitable for use to practice various aspects of the present disclosure, according to the disclosed embodiments.

FIG. 8 illustrates an example computer system that may be suitable for use to practice selected aspects of the present disclosure. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing the operations associated with face and gesture tracker 102, avatar animation engine 104 and avatar rendering engine 106, earlier described, collectively referred to as computational logic 822. The various elements may be implemented by assembler instructions supported by processor(s) 802 or high-level languages, such as, for example, C, that can be compiled into such instructions.

The number, capability and/or capacity of these elements 810-812 may vary, depending on whether computer 800 is used as a mobile device, a stationary device or a server. When use as mobile device, the capability and/or capacity of these elements 810-812 may vary, depending on whether the mobile device is a smartphone, a computing tablet, an ultrabook or a laptop. Otherwise, the constitutions of elements 810-812 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computer 800, in response to execution of the programming instructions, to perform, e.g., various operations associated with face and gesture tracker 102, avatar animation engine 104 and avatar rendering engine 106. In alternate embodiments, programming instructions 904 may be disposed on multiple computer-readable non-transitory storage media 902 instead. In alternate embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 8, for one embodiment, at least one of processors 802 may be packaged together with memory having computational logic 822 (in lieu of storing on memory 804 and storage 806). For one embodiment, at least one of processors 802 may be packaged together with memory having computational logic 822 to form a System in Package (SiP). For one embodiment, at least one of processors 802 may be integrated on the same die with memory having computational logic 822. For one embodiment, at least one of processors 802 may be packaged together with memory having computational logic 822 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for rendering an avatar. The apparatus may comprise a gesture tracker and an animation engine. The gesture tracker may be configured to detect and track a user gesture that corresponds to a canned facial expression, the user gesture including a duration component corresponding to a duration the canned facial expression is to be animated, and to respond to a detection and tracking of the user gesture, with output of one or more animation messages that describe the detection or the tracking of the user gesture or identify the canned facial expression, and the duration. The animation engine may be coupled with the gesture tracker and configured to receive the one or more animation messages, and drive an avatar model, in accordance with the one or more animation messages, to animate the avatar with animation of the canned facial expressions for the duration.

Example 2 may be example 1, wherein the gesture tracker may detect and track a swipe gesture that terminates with continuous touching of a touch screen for a time period, the swipe gesture corresponding to the canned facial expression to be animated, the duration component being the continuous touching of the touch screen, and the duration being the time period.

Example 3 may be example 1 or 2, wherein the animation engine may animate the canned facial expression by blending one or more pre-defined shapes into a neutral face during a start period.

Example 4 may be example 3, wherein the animation engine may hold the avatar at the canned facial expression for the duration during a keep period.

Example 5 may be example 4, wherein the animation engine may terminate animation of the canned facial expression by un-blending the one or more pre-defined shapes to return the avatar to the neutral face during an end period.

Example 6 may be any one of examples 1-5, wherein the gesture tracker may detect and track a user gesture that further includes a facial movement component corresponding to facial movements of the canned facial expression, and in response to a detection of the user gesture, output one or more animation messages that further identify the facial movements; and the animation engine to further drive the avatar model, in accordance with the one or more animation messages, to animate the avatar with animation of the canned facial expressions that includes the facial movements for the duration.

Example 7 may be any one of examples 1-5, wherein the gesture tracker may detect and track a swipe gesture that terminates with continuous touching of a touch screen, as well as sliding over a touch screen in one direction and in another direction for a time period, the swipe gesture corresponding to the canned facial expression to be animated, the sliding corresponding to the facial movements of the canned facial expression, the duration component being the continuous touching of the touch screen, and the duration being the time period.

Example 8 may be example 7, wherein the animation engine may animate the canned facial expression by blending first one or more pre-defined shapes into a neutral face during a start period, further blending or un-blending second one or more pre-defined shapes into the canned facial expression to animate the facial movements of the canned facial expression for the duration during a keep period, and un-blending the first or second one or more pre-defined shapes to return the avatar to the neutral face during an end period.

Example 9 may be any one of examples 1-8, wherein the gesture tracker may further accept definition of the user gesture.

Example 10 may be example 9, wherein the gesture tracker may accept finger movement trajectory, hand gestures, or facial gestures in defining the user gesture.

Example 11 may be example 9, wherein the gesture tracker may accept movement or action definition for the avatar in defining the user gesture.

Example 12 may be example 11, wherein the movement or action may be a selected one of
- the avatar following a path defined by a trajectory;
- the avatar moving randomly;
- the avatar fading away;
- the avatar bouncing up and down in accordance with a pattern; or
- the avatar spinning relative to an axis.

Example 13 may be a method for rendering an avatar. The method may comprise detecting and tracking, by a computing device, a user gesture that corresponds to a canned facial expression, the user gesture including a duration component corresponding to a duration the canned facial expression is to be animated, and in response to a detection and tracking of the user gesture, output one or more animation messages that describe the detection and tracking of the user gesture or identify the canned facial expression, and the duration; and driving an avatar model, by the computing device, in accordance with the one or more animation messages, to animate the avatar with animation of the canned facial expressions for the duration.

Example 14 may be example 13, wherein detecting and tracking may comprise detecting and tracking a swipe gesture that terminates with continuous touching of a touch screen for a time period, the swipe gesture corresponding to the canned facial expression to be animated, the duration component being the continuous touching of the touch screen, and the duration being the time period.

Example 15 may be example 13 or 14, wherein driving to animate the canned facial expression may comprise blending one or more pre-defined shapes into a neutral face during a start period.

Example 16 may be example 15, wherein driving to animate the canned facial expression may comprise holding the avatar at the canned facial expression for the duration during a keep period.

Example 17 may be example 16, wherein driving to animate the canned facial expression may comprise terminating animation of the canned facial expression by un-blending the one or more pre-defined shapes to return the avatar to the neutral face during an end period.

Example 18 may be any one of examples 13-17, wherein detecting and tracking may comprise detecting and tracking a user gesture that further includes a facial movement component corresponding to facial movements of the canned facial expression, and in response to a detection of the user gesture, outputting one or more animation messages that further identify the facial movements; and driving further comprises driving the avatar model, in accordance with the one or more animation messages, to animate the avatar with animation of the canned facial expressions that includes the facial movements for the duration.

Example 19 may be any one of examples 13-17, wherein detecting and tracking may comprise detecting and tracking a swipe gesture that terminates with continuous touching of a touch screen, as well as sliding over a touch screen in one direction and in another direction for a time period, the swipe gesture corresponding to the canned facial expression to be animated, the sliding corresponding to the facial movements of the canned facial expression, the duration component being the continuous touching of the touch screen, and the duration being the time period.

Example 20 may be example 19, wherein driving to animate the canned facial expression may comprise blending first one or more pre-defined shapes into a neutral face during a start period, further blending or un-blending second one or more pre-defined shapes into the canned facial expression to animate the facial movements of the canned facial expression for the duration during a keep period, and un-blending the first or second one or more pre-defined shapes to return the avatar to the neutral face during an end period.

Example 21 may be any one of examples 13-17, further comprising accepting definition of the user gesture.

Example 22 may be example 21, wherein accepting may comprise accepting finger movement trajectory, hand gestures, or facial gestures in defining the user gesture.

Example 23 may be example 21, wherein accepting may comprise accepting movement or action definition for the avatar in defining the user gesture.

Example 24 may be example 23, wherein the movement or action may be a selected one of
 the avatar following a path defined by a trajectory;
 the avatar moving randomly;
 the avatar fading away;
 the avatar bouncing up and down in accordance with a pattern; or
 the avatar spinning relative to an axis.

Example 25 may be one or more computer-readable storage medium comprising a plurality of instructions to cause a computing device, in response to execution of the instructions by the computing device, to cause the computing device to: detect and track a user gesture that corresponds to a canned facial expression, the user gesture including a duration component corresponding to a duration the canned facial expression is to be animated, and in response to a detection and tracking of the user gesture, output one or more animation messages that describe the detection or the tracking of the user gesture or identify the canned facial expression, and the duration; and drive an avatar model, in accordance with the one or more animation messages, to animate the avatar with animation of the canned facial expressions for the duration.

Example 26 may be example 25, wherein to detect and track may comprise to detect and track a swipe gesture that terminates with continuous touching of a touch screen for a time period, the swipe gesture corresponding to the canned facial expression to be animated, the duration component being the continuous touching of the touch screen, and the duration being the time period.

Example 27 may be example 25 or 26, wherein to animate the canned facial expression may comprise to blend one or more pre-defined shapes into a neutral face during a start period.

Example 28 may be example 27, wherein to animate the canned facial expression may comprise to hold the avatar at the canned facial expression for the duration during a keep period.

Example 29 may be example 28, wherein to animate the canned facial expression may comprise to terminate animation of the canned facial expression by un-blending the one or more pre-defined shapes to return the avatar to the neutral face during an end period.

Example 30 may be any one of examples 25-29, wherein to detect and track may comprise to detect and track a user gesture that further includes a facial movement component corresponding to facial movements of the canned facial expression, and in response to a detection of the user gesture, output one or more animation messages that further identify the facial movements; and the animation engine to further drive the avatar model, in accordance with the one or more animation messages, to animate the avatar with animation of the canned facial expressions that includes the facial movements for the duration.

Example 31 may be any one of examples 25-29, wherein to detect and track may comprise to detect and track a swipe gesture that terminates with continuous touching of a touch screen, as well as sliding over a touch screen in one direction and in another direction for a time period, the swipe gesture corresponding to the canned facial expression to be animated, the sliding corresponding to the facial movements of the canned facial expression, the duration component being the continuous touching of the touch screen, and the duration being the time period.

Example 32 may be example 31, wherein to animate the canned facial expression may comprise to blend first one or more pre-defined shapes into a neutral face during a start period, further blend or un-blend second one or more pre-defined shapes into the canned facial expression to animate the facial movements of the canned facial expression for the duration during a keep period, and un-blend the first or second one or more pre-defined shapes to return the avatar to the neutral face during an end period.

Example 33 may be any one of examples 25-32, wherein the computing device may be further caused to accept definition of the user gesture.

Example 34 may be example 33, wherein the computing device may be further caused to accept finger movement trajectory, hand gestures, or facial gestures in defining the user gesture.

Example 35 may be example 33, wherein the computing device may be further caused to accept movement or action definition for the avatar in defining the user gesture.

Example 36 may be example 35, wherein the movement or action may be a selected one of
 the avatar following a path defined by a trajectory;
 the avatar moving randomly;
 the avatar fading away;
 the avatar bouncing up and down in accordance with a pattern; or
 the avatar spinning relative to an axis.

Example 37 may be an apparatus for rendering an avatar. The apparatus may comprise gesture tracking means and animation means. The gesture tracking means may be for detecting and tracking a user gesture that corresponds to a canned facial expression, the user gesture including a duration component corresponding to a duration the canned facial expression is to be animated, and in response to a detection and tracking of the user gesture, output one or more animation messages that described the detection and tracking of the user gesture, or identify the canned facial expression, and the duration. The animation means may be for receiving the one or more animation messages, and driving an avatar model, in accordance with the one or more animation messages, to animate the avatar with animation of the canned facial expressions for the duration.

Example 38 may be example 37, wherein the gesture tracking means may comprise means for detecting and tracking a swipe gesture that terminates with continuous touching of a touch screen for a time period, the swipe gesture corresponding to the canned facial expression to be animated, the duration component being the continuous touching of the touch screen, and the duration being the time period.

Example 39 may be example 37 or 38, wherein the animation means may comprise means for animating the canned facial expression by blending one or more pre-defined shapes into a neutral face during a start period.

Example 40 may be example 39, wherein the animation means may comprise means for holding the avatar at the canned facial expression for the duration during a keep period.

Example 41 may be example 40, wherein the animation means may comprise means for terminating animation of the canned facial expression by un-blending the one or more pre-defined shapes to return the avatar to the neutral face during an end period.

Example 42 may be any one of example 37-41, wherein the gesture tracking means may comprise means for detecting and tracking a user gesture that further includes a facial movement component corresponding to facial movements of the canned facial expression, and in response to a detection of the user gesture, output one or more animation messages that further identify the facial movements; and the animation engine to further drive the avatar model, in accordance with the one or more animation messages, to animate the avatar with animation of the canned facial expressions that includes the facial movements for the duration.

Example 43 may be any one of example 37-41, wherein the gesture tracking means may comprise means for detecting and tracking a swipe gesture that terminates with continuous touching of a touch screen, as well as sliding over a touch screen in one direction and in another direction for a time period, the swipe gesture corresponding to the canned facial expression to be animated, the sliding corresponding to the facial movements of the canned facial expression, the duration component being the continuous touching of the touch screen, and the duration being the time period.

Example 44 may be example 43, wherein the animation means may comprise means for animating the canned facial expression by blending first one or more pre-defined shapes into a neutral face during a start period, further blending or un-blending second one or more pre-defined shapes into the canned facial expression to animate the facial movements of the canned facial expression for the duration during a keep period, and un-blending the first or second one or more pre-defined shapes to return the avatar to the neutral face during an end period.

Example 45 may be any one of examples 37-44, wherein the gesture tracking means may further comprise means for accepting definition of the user gesture.

Example 46 may be example 45, wherein the gesture tracking means may further comprise means for accepting finger movement trajectory, hand gestures, or facial gestures in defining the user gesture.

Example 47 may be example 45, wherein the gesture tracking means may further comprise means for accepting movement or action definition for the avatar in defining the user gesture.

Example 48 may be example 47, wherein the movement or action may be a selected one of
 the avatar following a path defined by a trajectory;
 the avatar moving randomly;
 the avatar fading away;
 the avatar bouncing up and down in accordance with a pattern; or
 the avatar spinning relative to an axis.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for rendering an avatar, comprising:
 a gesture tracker to detect and track a user gesture that corresponds to a canned facial expression, the user gesture including a duration component corresponding to a duration the canned facial expression is to be animated, and in response to a detection and tracking of the user gesture, output one or more animation messages that describe the detection or the tracking of the user gesture or identify the canned facial expression, and the duration; and
 an animation engine coupled with the gesture tracker to receive the one or more animation messages, and drive an avatar model, in accordance with the one or more animation messages, to animate the avatar with animation of the canned facial expressions for the duration
 wherein the animation engine is to animate the canned facial expression by blending one or more pre-defined shapes into a neutral face during a start period, hold the avatar at the canned facial expression for the duration during a keep period, and terminate animation of the canned facial expression by un-blending the one or more pre-defined shapes to return the avatar to the neutral face during an end period.

2. The apparatus of claim 1, wherein the gesture tracker is to detect and track a swipe gesture that terminates with continuous touching of a touch screen for a time period, the swipe gesture corresponding to the canned facial expression to be animated, the duration component being the continuous touching of the touch screen, and the duration being the time period.

3. The apparatus of claim 1, wherein the gesture tracker is to detect and track a user gesture that further includes a facial movement component corresponding to facial movements of the canned facial expression, and in response to a detection of the user gesture, output one or more animation messages that further identify the facial movements; and the animation engine to further drive the avatar model, in accordance with the one or more animation messages, to animate the avatar with animation of the canned facial expressions that includes the facial movements for the duration.

4. The apparatus of claim 1, wherein the gesture tracker is to detect and track a swipe gesture that terminates with continuous touching of a touch screen, as well as sliding over a touch screen in one direction and in another direction for a time period, the swipe gesture corresponding to the canned facial expression to be animated, the sliding corresponding to the facial movements of the canned facial expression, the duration component being the continuous touching of the touch screen, and the duration being the time period.

5. The apparatus of claim 4, wherein the animation engine is to animate the canned facial expression by blending first one or more pre-defined shapes into a neutral face during the start period, further blending or un-blending second one or more pre-defined shapes into the canned facial expression to animate the facial movements of the canned facial expression for the duration during the keep period, and un-blending the first or second one or more pre-defined shapes to return the avatar to the neutral face during the end period.

6. The apparatus of claim 1, wherein the gesture tracker is to further accept definition of the user gesture.

7. The apparatus of claim 6, wherein the gesture tracker is to accept finger movement trajectory, hand gestures, or facial gestures in defining the user gesture.

8. The apparatus of claim 6, wherein the gesture tracker is to accept movement or action definition for the avatar in defining the user gesture.

9. The apparatus of claim 8, wherein the movement or action is a selected one of
the avatar following a path defined by a trajectory;
the avatar moving randomly;
the avatar fading away;
the avatar bouncing up and down in accordance with a pattern; or
the avatar spinning relative to an axis.

10. A method for rendering an avatar, comprising:
detecting and tracking, by a computing device, a user gesture that corresponds to a canned facial expression, the user gesture including a duration component corresponding to a duration the canned facial expression is to be animated, and in response to a detection and tracking of the user gesture, output one or more animation messages that describe the detection and tracking of the user gesture or identify the canned facial expression, and the duration; and
driving an avatar model, by the computing device, in accordance with the one or more animation messages, to animate the avatar with animation of the canned facial expressions for the duration;
wherein detecting and tracking comprise detecting and tracking a swipe gesture that terminates with continuous touching of a touch screen for a time period, the swipe gesture corresponding to the canned facial expression to be animated, the duration component being the continuous touching of the touch screen, and the duration being the time period; and
wherein driving to animate the canned facial expression comprises blending one or more pre-defined shapes into a neutral face during a start period; holding the avatar at the canned facial expression for the duration during a keep period; and terminating animation of the canned facial expression by un-blending the one or more pre-defined shapes to return the avatar to the neutral face during an end period.

11. The method of claim 10, wherein detecting and tracking further comprises detecting and tracking sliding over the touch screen in one direction and in another direction for another time period, the sliding corresponding to facial movements of the canned facial expression.

12. The method of claim 10, further comprising accepting definition of the user gesture; wherein accepting comprises accepting finger movement trajectory, hand gestures, or facial gestures in defining the user gesture.

13. One or more non-transitory computer-readable storage medium comprising a plurality of instructions to cause a computing device, in response to execution of the instructions by the computing device, to cause the computing device to:
detect and track a user gesture that corresponds to a canned facial expression, the user gesture including a duration component corresponding to a duration the canned facial expression is to be animated, and in response to a detection and tracking of the user gesture, output one or more animation messages that describe the detection or the tracking of the user gesture or identify the canned facial expression, and the duration; and
drive an avatar model, in accordance with the one or more animation messages, to animate the avatar with animation of the canned facial expressions for the duration;
wherein to animate the canned facial expression comprise to blend one or more pre-defined shapes into a neutral face during a start period, to hold the avatar at the canned facial expression for the duration during a keep period, and to terminate animation of the canned facial expression by un-blending the one or more pre-defined shapes to return the avatar to the neutral face during an end period.

14. The computer-readable storage medium of claim 13, wherein to detect and track comprises to detect and track a swipe gesture that terminates with continuous touching of a touch screen for a time period, the swipe gesture corresponding to the canned facial expression to be animated, the duration component being the continuous touching of the touch screen, and the duration being the time period.

15. The computer-readable storage medium of claim 13, wherein to detect and track comprises to detect and track a user gesture that further includes a facial movement component corresponding to facial movements of the canned facial expression, and in response to a detection of the user gesture, output one or more animation messages that further identify the facial movements; and an animation engine to further drive the avatar model, in accordance with the one or more animation messages, to animate the avatar with animation of the canned facial expressions that includes the facial movements for the duration.

16. The computer-readable storage medium of claim 13, wherein to detect and track comprise to detect and track a swipe gesture that terminates with continuous touching of a touch screen, as well as sliding over a touch screen in one direction and in another direction for a time period, the swipe gesture corresponding to the canned facial expression to be animated, the sliding corresponding to facial movements of the canned facial expression, the duration component being the continuous touching of the touch screen, and the duration being the time period.

17. The computer-readable storage medium of claim 13, wherein the computing device is further caused to accept definition of the user gesture, including finger movement trajectory, hand gestures, or facial gestures in defining the user gesture.

* * * * *